United States Patent
Hama et al.

(10) Patent No.: US 10,275,678 B2
(45) Date of Patent: Apr. 30, 2019

(54) BIOMETRIC IMAGE PROCESSING APPARATUS, BIOMETRIC IMAGE PROCESSING METHOD AND STORAGE MEDIUM

(71) Applicant: FUJITSU LIMITED, Kawasaki-shi, Kanagawa (JP)

(72) Inventors: Soichi Hama, Atsugi (JP); Hajime Nada, Kawasaki (JP); Satoshi Maeda, Atsugi (JP); Satoshi Semba, Kawasaki (JP); Yukihiro Abiko, Kawasaki (JP); Shinji Egashira, Yokohama (JP); Toshiaki Wakama, Kawasaki (JP); Rie Hasada, Tama (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/686,562

(22) Filed: Aug. 25, 2017

(65) Prior Publication Data
US 2018/0068201 A1    Mar. 8, 2018

(30) Foreign Application Priority Data
Sep. 2, 2016 (JP) .................................. 2016-172306

(51) Int. Cl.
| | | |
|---|---|---|
| G06K 9/00 | (2006.01) | |
| G06K 9/46 | (2006.01) | |
| G06T 7/136 | (2017.01) | |
| G06T 7/194 | (2017.01) | |

(Continued)

(52) U.S. Cl.
CPC ....... *G06K 9/4652* (2013.01); *G06K 9/00067* (2013.01); *G06K 9/00382* (2013.01); *G06K 9/00885* (2013.01); *G06T 7/11* (2017.01); *G06T 7/136* (2017.01); *G06T 7/194* (2017.01); *G06T 7/90* (2017.01); *G06K 2009/00395* (2013.01);

(Continued)

(58) Field of Classification Search
CPC combination set(s) only.
See application file for complete search history.

(56) References Cited

U.S. PATENT DOCUMENTS

| | | | |
|---|---|---|---|
| 2005/0036704 A1* | 2/2005 | Dumitras | ........... G06K 9/00234 382/260 |
| 2005/0281464 A1 | 12/2005 | Kaku | |
| 2006/0165286 A1 | 7/2006 | Kaku | |

(Continued)

FOREIGN PATENT DOCUMENTS

| | | |
|---|---|---|
| JP | 2006-031690 | 2/2006 |
| JP | 2006-260401 | 9/2006 |

(Continued)

OTHER PUBLICATIONS

Al-Tairi, Skin Segmentation Using YUV and RGB Color Spaces, Jun. 2014.*

(Continued)

*Primary Examiner* — Alex Kok S Liew
(74) *Attorney, Agent, or Firm* — Fujitsu Patent Center

(57) ABSTRACT

A biometric image processing apparatus including a memory and a processor coupled to the memory. The processor obtains a Y value, a U value and a V value in a YUV space from each pixel of an image, determines, for each pixel, whether or not the U value and the V value are in a range that is in accordance with the Y value, and extracts a pixel having been determined to be in the range.

12 Claims, 15 Drawing Sheets

(51) Int. Cl.
*G06T 7/11* (2017.01)
*G06T 7/90* (2017.01)

(52) U.S. Cl.
CPC .............. *G06K 2009/00932* (2013.01); *G06T 2207/10024* (2013.01)

(56) References Cited

U.S. PATENT DOCUMENTS

2006/0221090 A1 10/2006 Takeshima et al.
2014/0104163 A1 4/2014 Ide et al.

FOREIGN PATENT DOCUMENTS

JP 2012-014535 1/2012
WO 2012/173001 12/2012

OTHER PUBLICATIONS

Extended European Search Report dated Dec. 6, 2017 for corresponding European Patent Application No. 17187927.3, 8 pages.
Ahuja, Mandeep Kaur et al., "Static Vision Based Hand Gesture Recognition Using Principal Component Analysis", 2015 IEEE 3rd International Conference on MOOCs, Innovation and Technology in Education (MITE), IEEE, Oct. 1, 2015, pp. 402-406, XP032842468.

\* cited by examiner

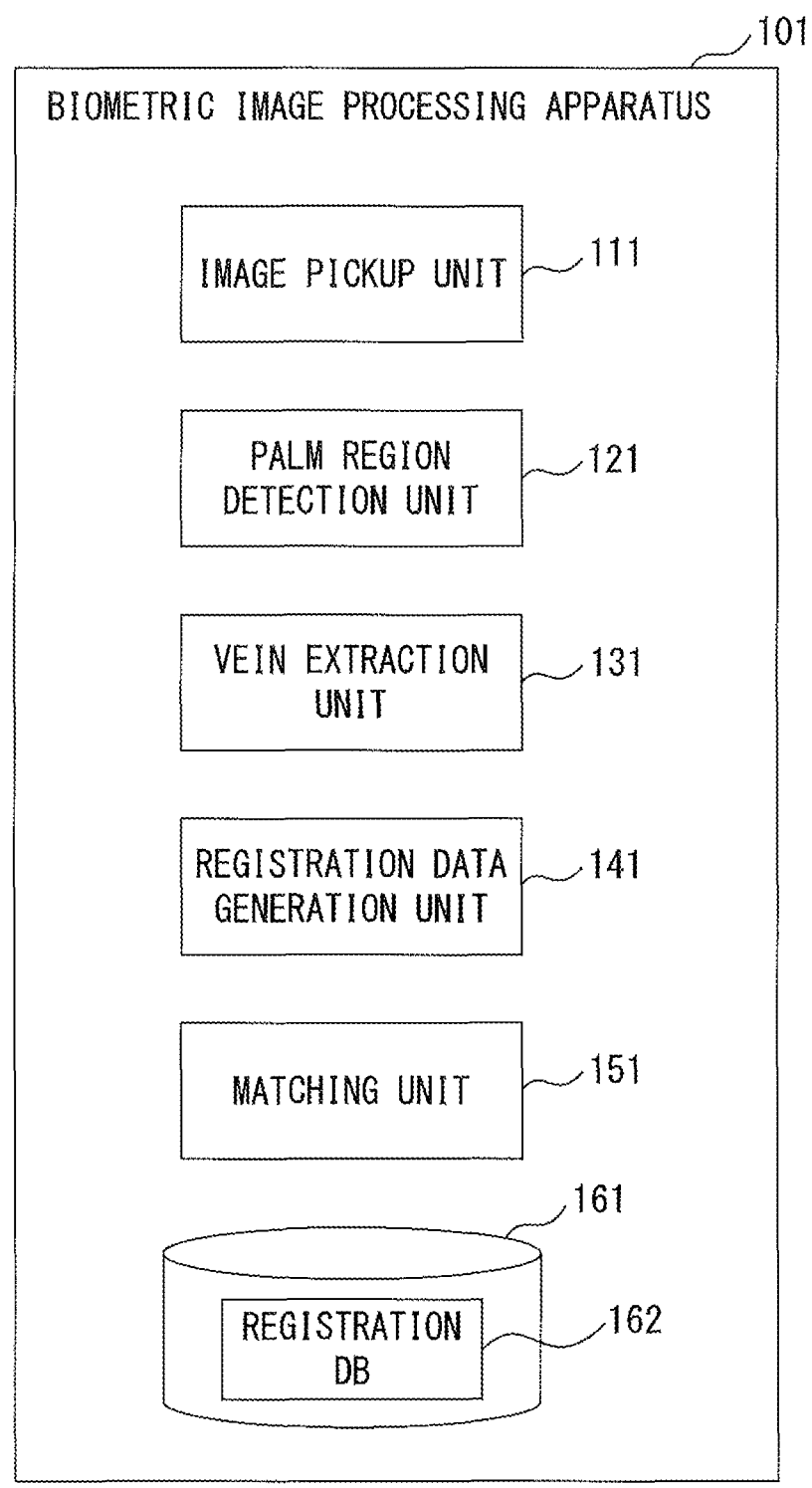
F I G. 9

BIOMETRIC IMAGE PROCESSING APPARATUS, BIOMETRIC IMAGE PROCESSING METHOD AND STORAGE MEDIUM

CROSS-REFERENCE TO RELATED APPLICATION

This application is based upon and claims the benefit of priority of the prior Japanese Patent Application No. 2016-172306, filed on Sep. 2, 2016, the entire contents of which are incorporated herein by reference.

FIELD

The embodiments discussed herein are related to a biometric image processing apparatus, a biometric image processing method and a non-transitory storage medium.

BACKGROUND

Biometric authentication is a technique for identifying a person by using a biometric feature such as a fingerprint, a face, a vein, etc. In biometric authentication, a biometric feature that has been registered in advance is compared (matched) with biometric feature obtained in a scene where confirmation is needed, and a person is identified on the basis of whether or not the biometric feature matches with the registered template.

When vein authentication is conducted on the basis of a vein of a palm by using a terminal such as a mobile phone having a biometric authentication function, the user captures an image of his or her palm in order to obtain vein information. In such a case, the user captures an image with his or her palm a little distant from the vein sensor (camera for example) of the terminal. In such a case, a captured image 11 obtained from the vein sensor sometimes includes a background 13 in addition to a palm 12 as illustrated in FIG. 1. A terminal having a biometric authentication function identifies a region on the palm 12 (palm region) from the captured image 11 in order to achieve authentication accuracy that is needed. Then, the terminal extracts the palm region from the captured image 11 to generate a process image 14 that includes only the palm 12 as illustrated in FIG. 2, and obtains vein information.

As a technique for identifying a region, there is a technique that converts an input image of an RGB format or a YUV format into an HSV format and sets an appropriate threshold (constant) based on distributions of respective color components in a palm region in the HSV space in order to determine whether or not the region is a palm (threshold method). A technique of detecting a flesh color region from an HSV space by using a threshold method is known (see Patent Document 1 for example).

A YUV format is wildly used for an image output by a camera device that is used as a sensor. When a palm region is to be detected in a YUV space, a threshold method sometimes results in erroneous detection of a palm region, deteriorating authentication accuracy.

[Patent Document 1] International Publication Pamphlet No. 2012/173001
[Patent Document 2] Japanese Laid-open Patent Publication No. 2012-14535
[Patent Document 3] Japanese Laid-open Patent Publication No. 2006-260401
[Patent Document 4] Japanese Laid-open Patent Publication No. 2006-31690

SUMMARY

According to an aspect of the invention, a biometric image processing apparatus includes a memory and a processor coupled to the memory.

The processor obtains a Y value, a U value and a V value in a YUV space from each pixel of an image.

The processor determines, for each pixel, whether or not the U value and the V value are in a range that is in accordance with the Y value.

The processor extracts a pixel having been determined to be in the range.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 9 is a configuration diagram of a biometric image processing apparatus according to the embodiment.

DESCRIPTION OF EMBODIMENTS

Generally, images output from a camera used as a sensor are in a YUV format, and conversion from a YUV format into an HSV format is performed in order to identify a region by using a threshold method in an HSV space. However, there is a problem that processes of converting a YUV image into an HSV image are costly in calculation.

Also, when a palm region detection is to be performed in a YUV space, U and V signals of a palm region change nonlinearly depending upon luminance (Y) in a YUV space, leading to erroneous detection of part of the background as a palm region, which deteriorates the authentication accuracy.

Explanations will first be given for an example of detecting a palm region by using a threshold method in a YUV space.

Figure 3:
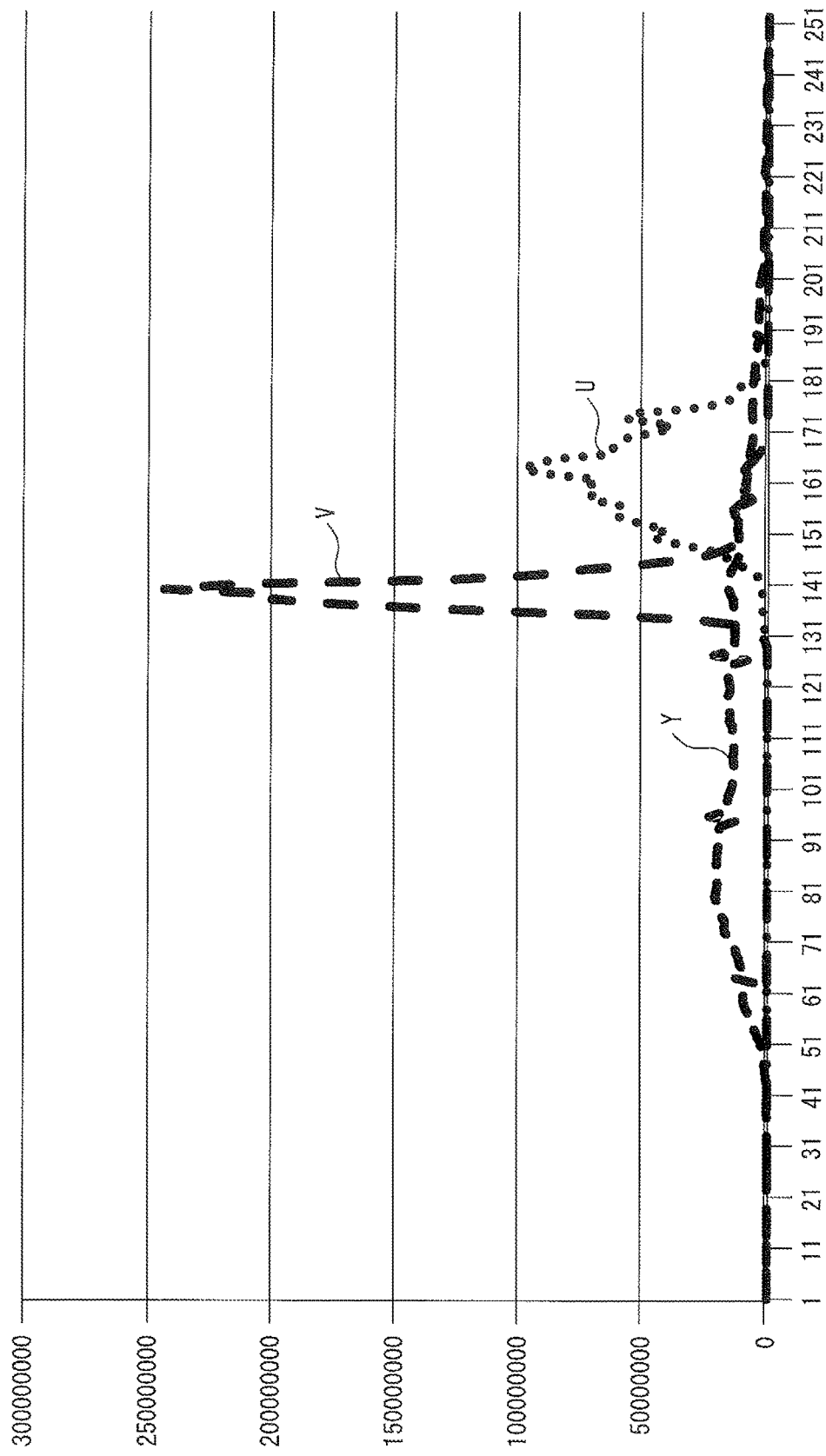
FIG. 3 illustrates distributions of YUV components of each pixel of a palm region.

For example, FIG. 3 illustrates distributions of YUV components of each pixel in a region of the palm 12 (palm region) in the captured image 11. In FIG. 3, the vertical axis represents the number of pixels and the horizontal axis represents value of Y, U or V. Y represents luminance, U represents difference between luminance and blue color (color difference), and V represents difference between luminance and red color (color difference).

In a threshold method, from distributions of YUV components as illustrated in FIG. 3, a range (threshold) of each color component of a pixel that is determined to be a palm is set. It is now assumed that the minimum value of a Y component of a pixel determined to be a palm is YMIN and the maximum value of the Y component of a pixel determined to be a palm is YMAX. It is also assumed that the minimum value of a U component of a pixel determined to be a palm is UMIN, and the maximum value of the U component of a pixel determined to be a palm is UMAX. It is also assumed that the minimum value of a V component of a pixel determined to be a palm is VMIN, and the maximum value of the V component of a pixel determined to be a palm is VMAX. Note that YMIN, YMAX, UMIN, UMAX, VMIN and VMAX are constants.

When it is assumed that the values of YUV components of pixel values of pixel P are Y, U and V, respectively, given pixel P is determined to be a palm when YMIN≤Y≤YMAX, UMIN≤U≤UMAX and VMZN≤V≤VMAX are satisfied.

Figure 4:
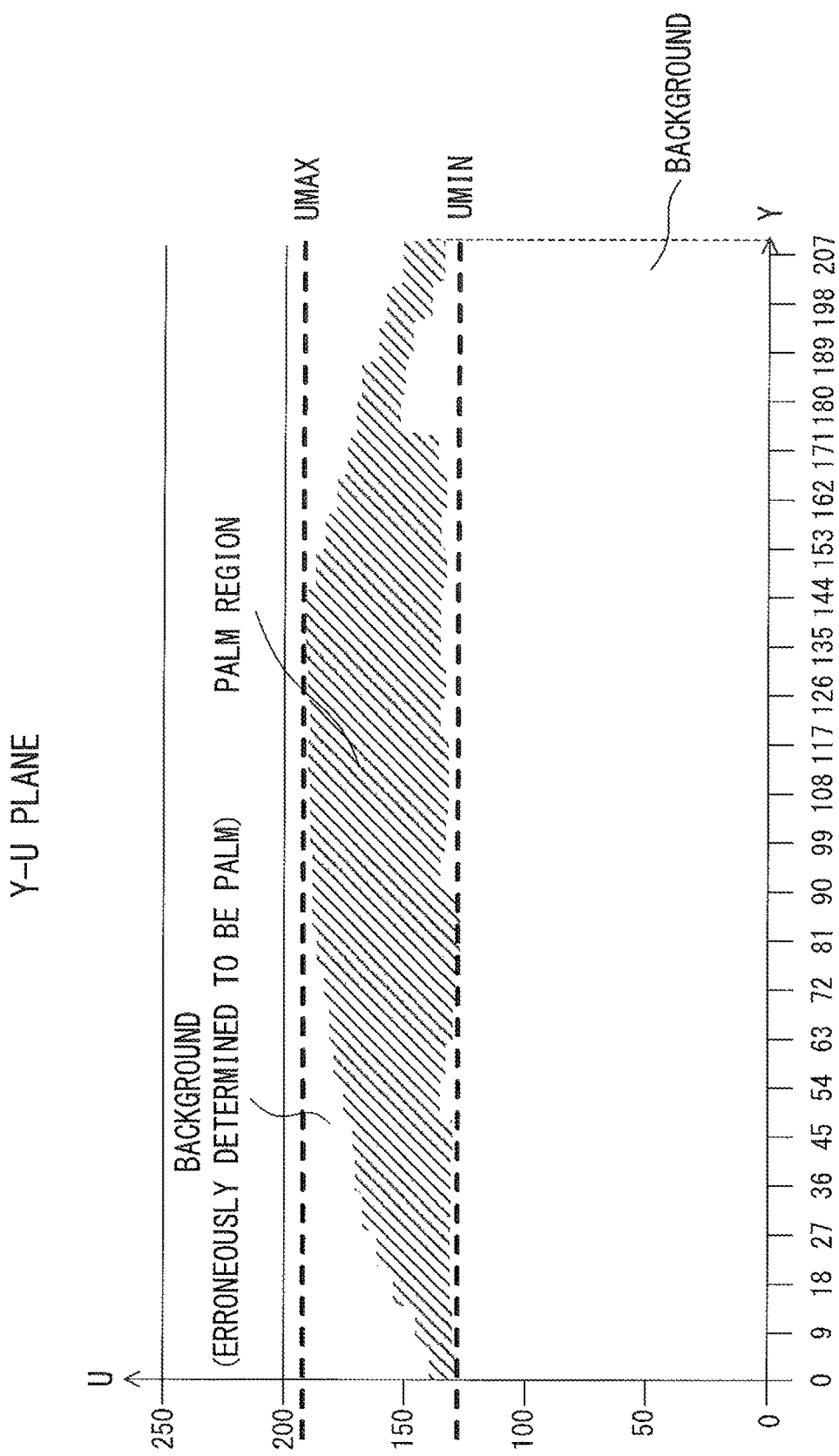
FIG. 4 illustrates distributions of Y components and U components of pixels of a palm region.

FIG. 4 illustrates distributions, on a Y-U plane, of Y components and U components of pixels of a region of the palm 12 of the captured image 11. In FIG. 4, the vertical axis represents value (U) of U component of a pixel value, and the horizontal axis represents value (Y) of Y component of a pixel value. In FIG. 4, the palm region is represented by oblique lines. Also, FIG. 4 illustrates minimum value UMIN and maximum value UMAX of U components of a pixel determined to be a palm.

As described above, a threshold method determines a pixel to be a palm when value (U) of a U component of the pixel is equal to or greater than UMIN and equal to or smaller than UMAX.

As illustrated in FIG. 4, the minimum value and the maximum value of U components of a palm region change nonlinearly depending upon Y components, and the minimum value and the maximum value of U components of a palm region are not equal to UMIN and UMAX, respectively. This leads to erroneous determination that a region between a palm region, which is represented by oblique lines, and UMIN and a region between a palm region, which is represented by oblique lines, and UMAX, are erroneously determined to be a palm while they are backgrounds in actuality.

Figure 5:
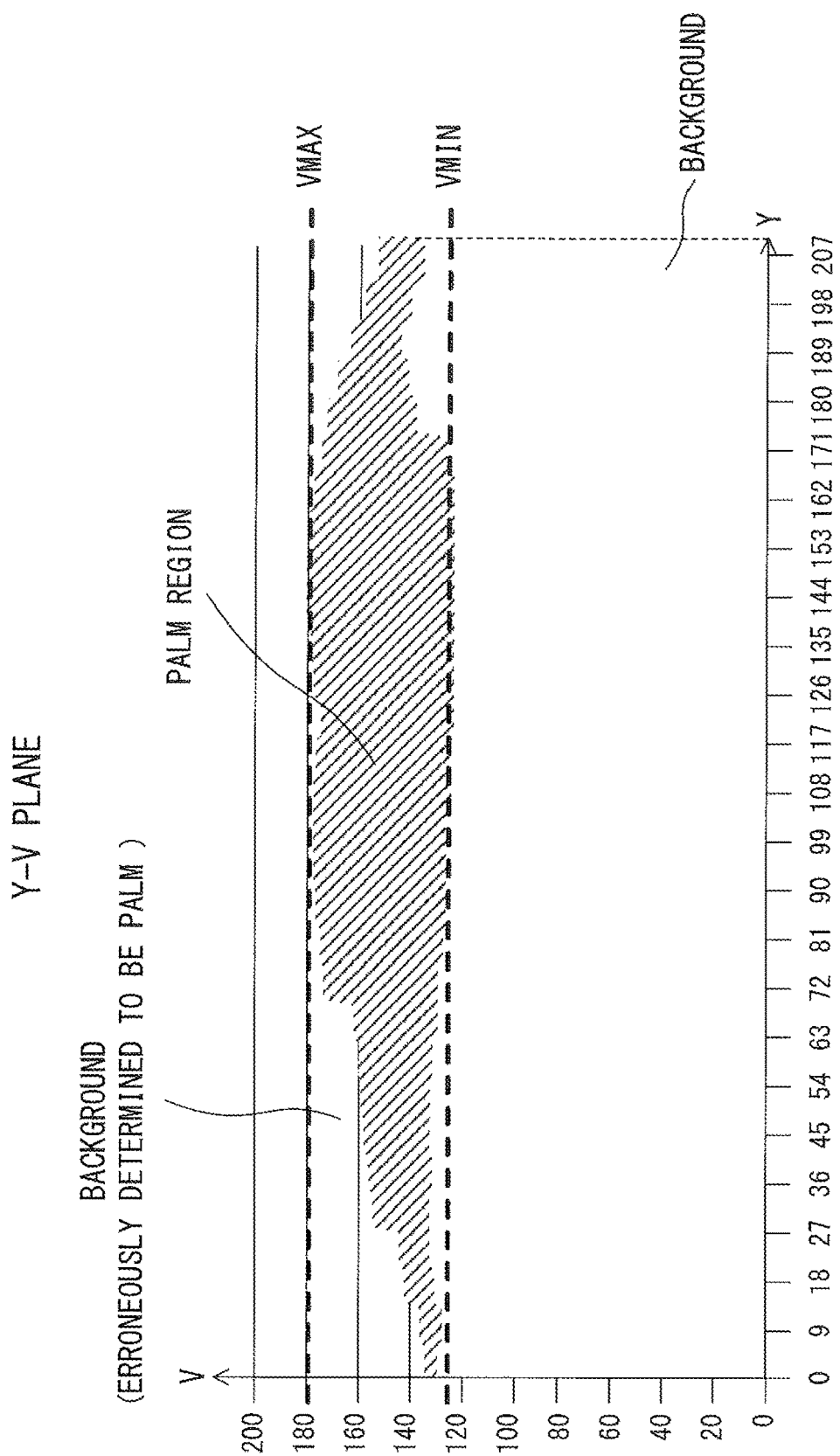
FIG. 5 illustrates distributions of Y components and V components of pixels of a palm region.

Similarly, FIG. 5 illustrates distributions, on a Y-V plane, of Y components and V components of pixels of a region of the palm 12 of the captured image 11. In FIG. 5, the vertical axis represents value (V) of V component of a pixel value, and the horizontal axis represents value (Y) of Y component of a pixel value. In FIG. 5, the palm region is represented by oblique lines. Also, FIG. 5 illustrates minimum value VMIN and maximum value VMAX of V components of a pixel determined to be a palm.

As described above, a threshold method determines a pixel to be a palm when value (V) of a V component of the pixel is equal to or greater than VMIN and equal to or smaller than VMAX.

As illustrated in FIG. 5, the minimum value and the maximum value of V components of a palm region change nonlinearly depending upon Y components, and the minimum value and the maximum value of V components of a palm region are not equal to VMIN and VMAX, respectively. This leads to erroneous determination that a region between a palm region, which is represented by oblique lines, and VMIN and a region between a palm region, which is represented by oblique lines, and VMAX, are erroneously determined to be a palm while they are backgrounds in actuality.

Figure 6:
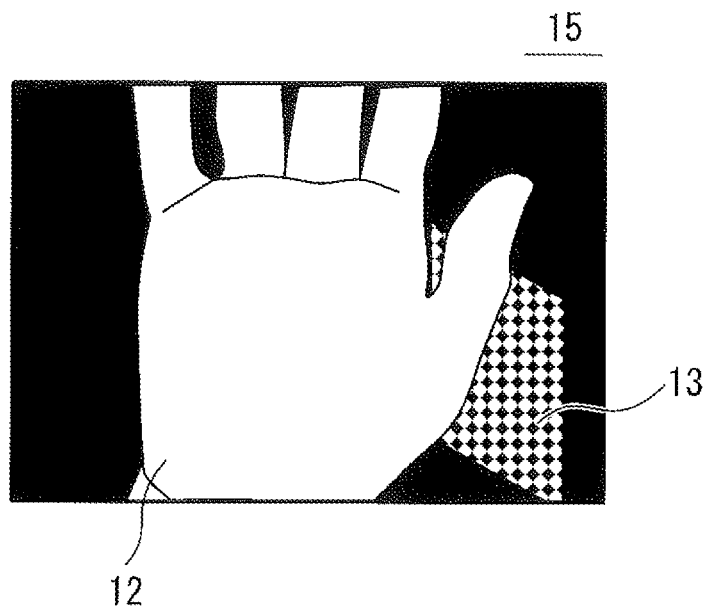
FIG. 6 illustrates an example of erroneous detection of a palm.

FIG. 6 illustrates an example of erroneous detection of a palm.

As described above, when a threshold method is used in a YUV space, part of the background included in captured image 11 is determined to be a palm in some cases. In such a case, detecting a palm region from the captured image by using a threshold method and displaying the palm region detected from the captured image results in a process image 15 as illustrated in FIG. 6.

The process image 15 includes the background 13 in addition to the palm 12, and when vein information is obtained by using the process image 15 so as to conduct vein authentication, the authentication accuracy is deteriorated.

Hereinafter, explanations will be given for the embodiments by referring to the drawings.

Figure 7:
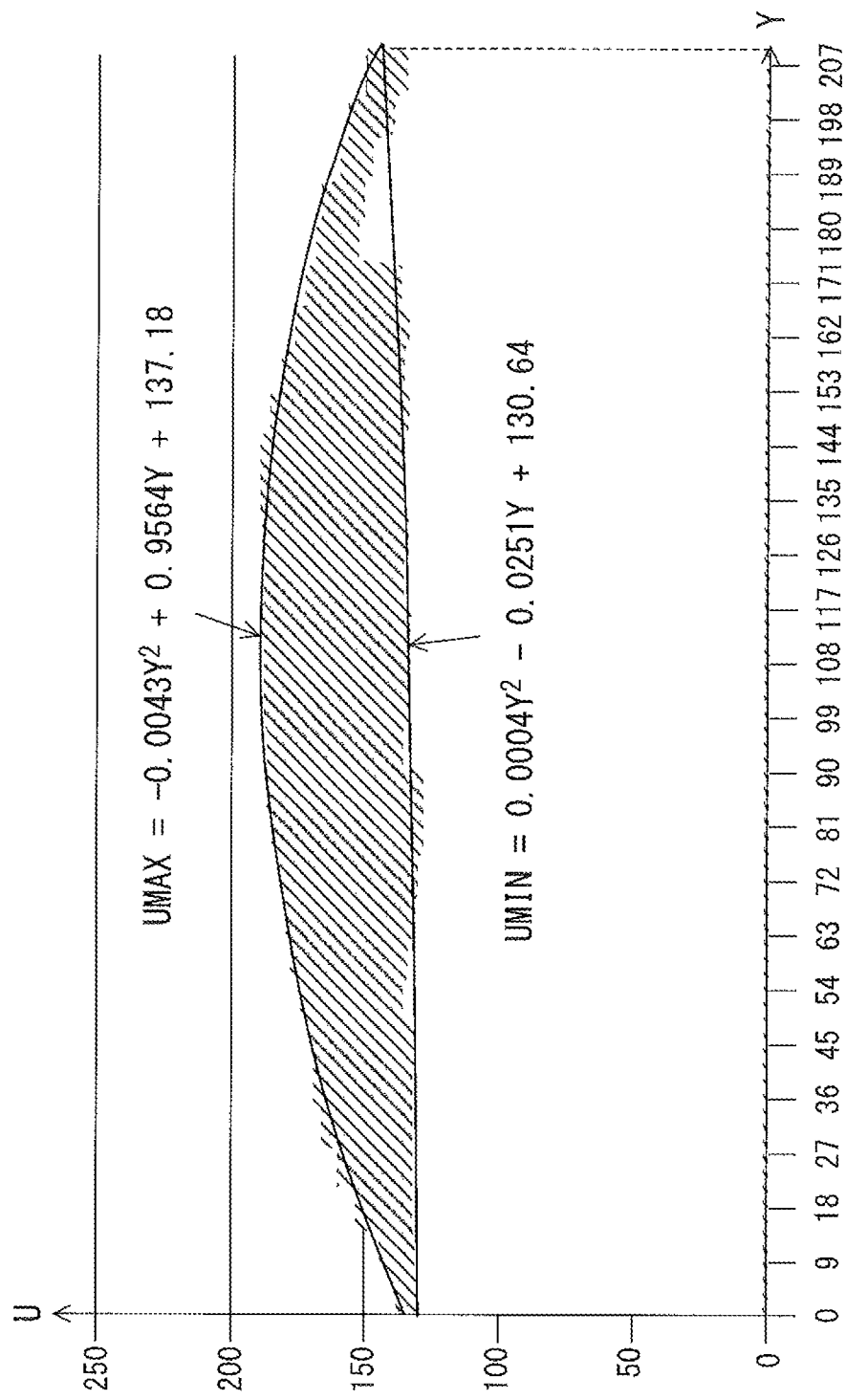
FIG. 7 illustrates distributions of Y components and U components of pixels of a palm region according to the embodiment and the maximum value and the minimum value of U components for Y components of pixels determined to be a palm.

FIG. 7 illustrates distributions of Y components and U components of pixels of a palm region according to the embodiment and the maximum value and the minimum value of U components for Y components of pixels determined to be a palm.

In FIG. 7, the vertical axis represents value (U) of U component of a pixel value, and the horizontal axis represents value (Y) of Y component of a pixel value. In FIG. 7, the palm region is represented by oblique lines. The palm region, represented by oblique lines, in FIG. 7 is a region obtained by superimposing regions of palms respectively of a plurality of captured images.

As illustrated in FIG. 7, the upper limit and the lower limit of the palm region change nonlinearly. In the embodiment, defining a region that is obtained by approximating the upper and lower limits of a palm region by using a polynomial makes it possible to detect a palm region highly accurately.

When the upper and lower limits of U components of the palm region illustrated in FIG. 7 are approximated by using a polynomial, the results are expressed by following expressions (1) and (2).

Specifically, maximum value UMAX of U components for value (Y) of Y components of pixels determined to be a palm is calculated by expression (1) below.

$$U\max=-0.0043Y^2+0.9564Y+137.18 \qquad (1)$$

Also, minimum value UMIN of U components for value (Y) of Y components of pixels determined to be a palm is calculated by expression (2) below.

$$U\min=0.0004Y^2-0.0251Y+130.64 \qquad (2)$$

Figure 8:
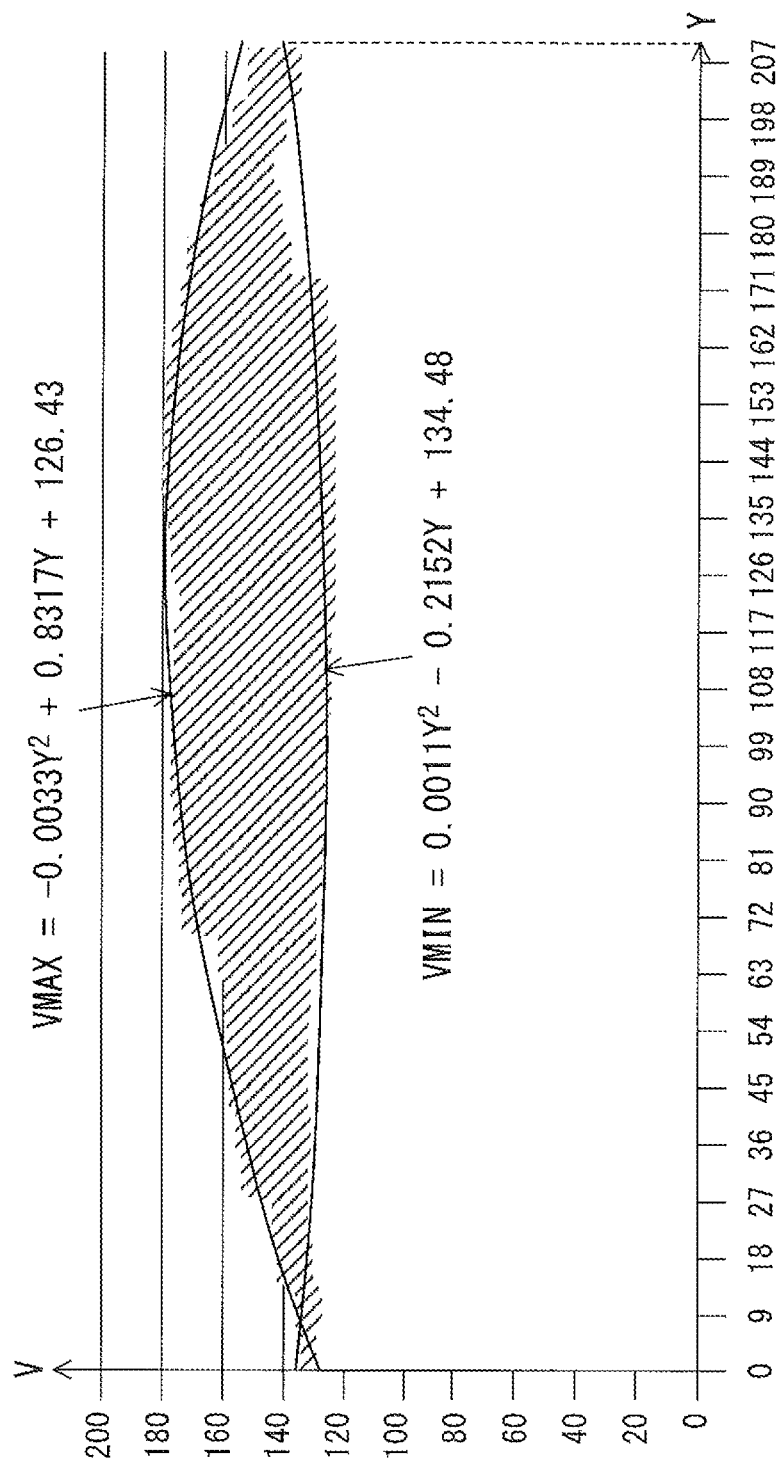
FIG. 8 illustrates distributions of Y components and V components of pixels of a palm region according to the embodiment and the maximum value and the minimum value of V components for Y components of pixels determined to be a palm.

FIG. 8 illustrates distributions of Y components and V components of pixels of a palm region according to the embodiment and the maximum value and the minimum value of V components for Y components of pixels determined to be a palm.

In FIG. 8, the vertical axis represents value (V) of V component of a pixel value, and the horizontal axis represents value (Y) of Y component of a pixel value. In FIG. 8, the palm region is represented by oblique lines. The palm region, represented by oblique lines, in FIG. 8 is a region obtained by superimposing regions of palms respectively of a plurality of captured images.

As illustrated in FIG. 8, the upper limit and the lower limit of the palm region change nonlinearly. In the embodiment, defining a region that is obtained by approximating the upper and lower limits of a palm region by using a polynomial makes it possible to detect a palm region highly accurately.

When the upper and lower limits of V components of the palm region illustrated in FIG. 8 are approximated by using a polynomial, the results are expressed by following expressions (3) and (4).

Specifically, maximum value VMAX of V components for value (Y) of Y components of pixels determined to be a palm is calculated by expression (3) below.

$$V\max=-0.0033Y^2+0.8317Y+126.43 \quad (3)$$

Also, minimum value VMIN of V components for value (Y) of Y components of pixels determined to be a palm is calculated by expression (4) below.

$$V\min=0.0011Y^2-0.2152Y+134.48 \quad (4)$$

When values of the Y component, the U component and the V component of given pixel P are Y, U and V, respectively in a biometric image processing method according to the embodiment, pixel P is determined to be a palm in a case when U is equal to or greater than UMIN calculate by expression (1) and is equal to or smaller than UMAX calculated by expression (2) and V is equal to or greater than VMIN calculated by expression (3) and is equal to or smaller than VMAX calculated by expression (4).

FIG. 9 is a configuration diagram of a biometric image processing apparatus according to the embodiment.

The biometric image processing apparatus 101 includes an image pickup unit 111, a palm region detection unit 121, a vein extraction unit 131, a registration data generation unit 141, a matching unit 151 and a storage unit 161. The biometric image processing apparatus 101 is for example a server, a personal computer, a mobile phone, a mobile phone terminal, etc.

Figure 1:
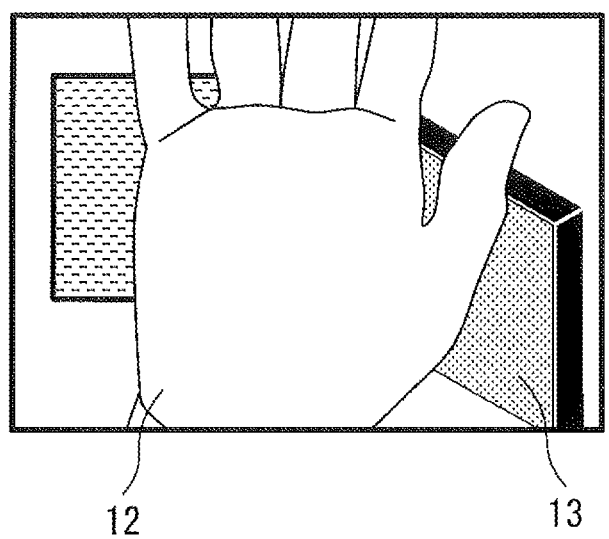
FIG. 1 illustrates an example of a captured image.

The image pickup unit 111 captures an image of a region containing a palm, and generates a captured image including a palm. For example, the captured image 11 including the palm 12 as illustrated in FIG. 1 is captured. The image pickup unit 111 is for example a camera, and outputs an image of a YUV format. In other words, a pixel value of each pixel of the captured image 11 includes three components; Y (luminance), U (color difference: difference between luminance and blue color), and V (color difference: difference between luminance and red color).

The palm region detection unit 121 detects a region of the palm 12 (palm region) from the captured image 11. The palm region detection unit 121 obtains a pixel value of each pixel of the captured image 11, determines whether or not the U value and the V value in the YUV space are in a range corresponding to the Y value for each pixel of the captured image 11, and extracts a pixel that has been determined to be in that range. The palm region detection unit 121 is an example of a pixel value obtainment unit, a determination unit and a biometric image extraction unit.

The vein extraction unit 131 extracts a vein from a palm region detected by the palm region detection unit 121.

The registration data generation unit 141 registers, in a registration DB 162, vein data representing a shape (pattern) of the vein network (vein pattern) extracted by the vein extraction unit 131.

The matching unit 151 matches the vein data obtained from the captured image 11 captured this time and vein data registered in the registration DB 162. In more detail, the matching unit 151 compares vein data representing the shape of the vein network extracted by the vein extraction unit 131 and the vein data included in the registration DB 162 so as to match whether or not they match.

The storage unit 161 stores data, a program, etc. that are used by the biometric image processing apparatus 101. The storage unit 161 stores the registration DB 162.

The registration DB 162 includes a plurality of pieces of vein data that represent shapes of veins.

The biometric image processing apparatus 101 detects a palm region from a captured image in both of the cases of registration and matching so as to extract a vein pattern from the palm region. Thereafter, the biometric image processing apparatus 101, for registration, generates registration data from the extracted vein pattern so as to register the data in the registration DB 162, and, for matching, matches the vein extracted this time and registration data that was registered before.

Figure 10:
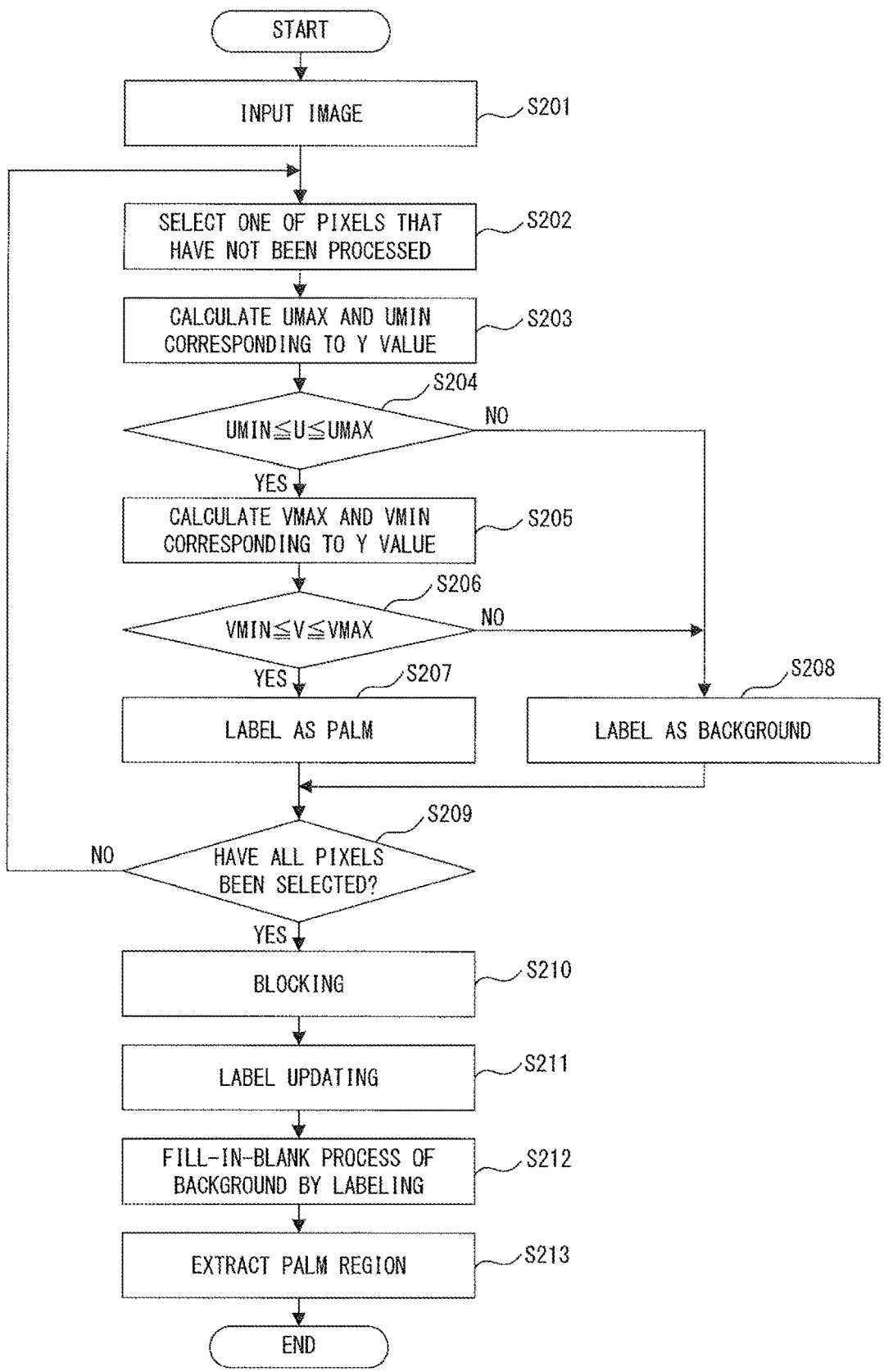
FIG. 10 is a flowchart of a biometric image process according to the embodiment.

FIG. 10 is a flowchart of a biometric image process according to the embodiment.

In step S201, the image pickup unit 111 captures an image of a region including a palm and a background so as to generate a captured image including the palm and the background. Note that the captured image is an image of a YUV format and the pixel value of each pixel of the captured image includes three components of Y, U and V.

In step S202, the palm region detection unit 121 selects one of pixels that have not been selected from among the pixels of the captured image. Hereinafter, a selected pixel will be referred to as a target pixel.

In step S203, the palm region detection unit 121 obtains the pixel value of a selected pixel. Then, the palm region detection unit 121 calculates the range (upper limit (UMAX) and lower limit (UMIN) of U components of the palm region corresponding to the value of the Y component (Y value) of the selected pixel by using expressions (1) and (2).

In step S204, the palm region detection unit 121 determines whether or not the value of the U component (U value) of the selected pixel is in the range calculated in step S203 (equal to or greater than UMIN and equal to or smaller than UMAX). When the U value is equal to or greater than UMIN and equal to or smaller than UMAX (UMIN≤U value≤UMAX), the control proceeds to step S205 and when the U value is smaller than UMIN or greater than UMAX, the control proceeds to step S208.

In step S205, the palm region detection unit 121 obtains the pixel value of the selected pixel. Then, the palm region detection unit 121 calculates the range (upper limit (VMAX) and lower limit (VMIN) of V components of the palm region corresponding to the value of the Y component (Y value) of the selected pixel by using expressions (3) and (4).

In step S206, the palm region detection unit 121 determines whether or not the value of the V component (V value) of the selected pixel is in the range calculated in step S205 (equal to or greater than VMIN and equal to or smaller than VMAX). When the V value is equal to or greater than VMIN and equal to or smaller than VMAX (VMIN≤V value≤VMAX), the control proceeds to step S207 and when the V value is smaller than VMIN or greater than VMAX, the control proceeds to step S208.

In step S207, the palm region detection unit 121 labels the selected pixel as the palm. Specifically, the palm region detection unit 121 assigns "palm" as a label for the selected pixel.

In step S208, the palm region detection unit 121 labels the selected pixel as the background. Specifically, the palm region detection unit 121 assigns "background" as a label for the selected pixel.

In step S209, when all the pixels in the captured image have been selected, i.e. when all the pixels have been labeled, the control proceeds to step S209. When not all the pixels in the captured image have been selected, the control returns to step S202.

In step S210, the palm region detection unit 121 generates a mask image from the results of labeling in step S207 and step S208, and divides the mask image into a plurality of regions (blocking). A mask image is an image in which the pixel value of a pixel labeled as a palm is 1 and the pixel value of a pixel labeled as a background is zero. Blocking of a mask image divides a mask image into M pieces in the lateral direction and into N pieces in the longitudinal direction, and each divisional region is referred to as a block. Note that, appropriate values are set for M and N in such a manner that one block is of for example 8 pixels by 8 pixels etc.

In step S211, the palm region detection unit 121 updates the pixel values of pixels in a block on the basis of decision by a majority of the pixel values of pixels in a block for each block.

Hereinafter, explanations will be given for an example of blocking (step S210) and updating (step S211) of a pixel value.

Figure 11:
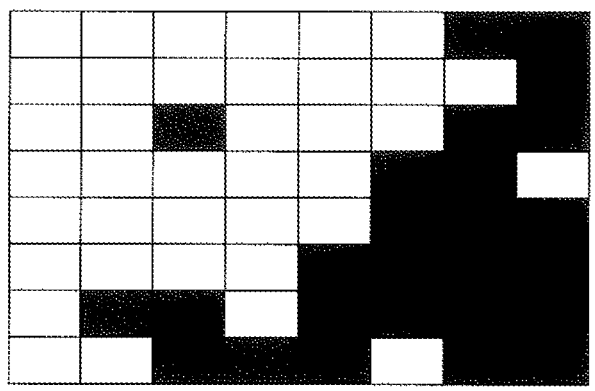
FIG. 11 illustrates an example of a mask image.

The palm region detection unit 121 generates a mask image in which the pixel value of a pixel labeled as the palm is 1 and the pixel value of a pixel labeled as the background is zero. It is now assumed that a mask image 21 as illustrated in FIG. 11 is generated. In the mask image 21, pixels with pixel value=1 are represented in white and pixels with pixel value=0 are represented in black.

Figure 12:
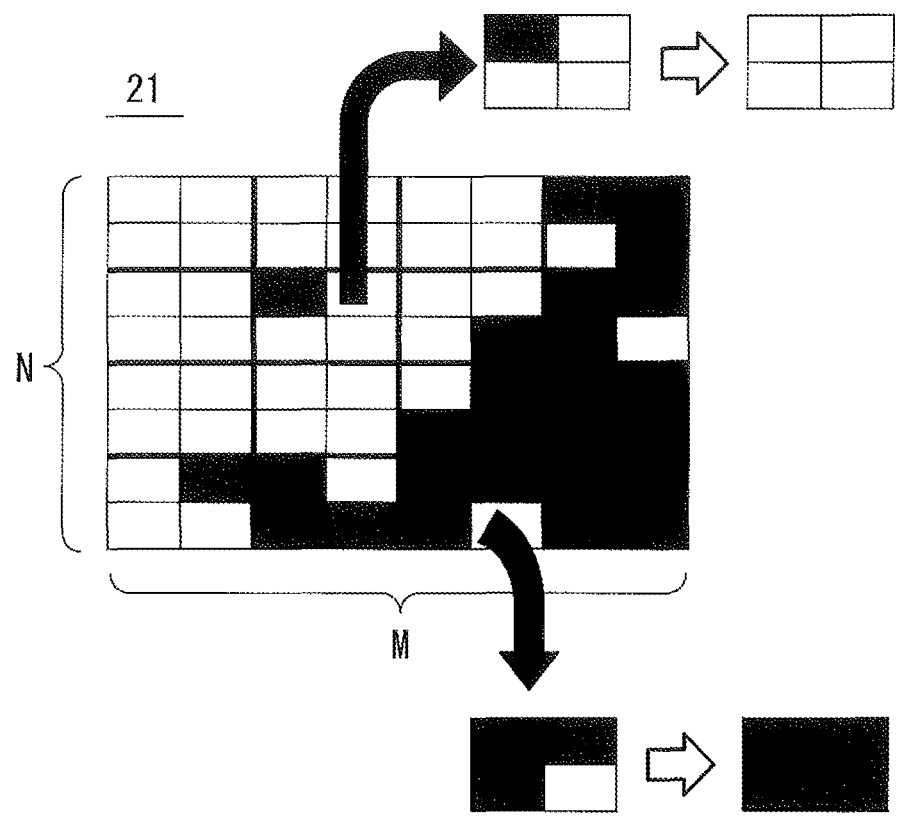
FIG. 12 explains blocking and update of a pixel value.

The palm region detection unit 121 divides the mask image 21 into M (=4) pieces in the lateral direction and into N (=4) pieces in the longitudinal direction illustrated in FIG. 12 so as to generate 16 blocks. In FIG. 12, one block is constituted of 4 (2 by 2) pixels.

For each block, the palm region detection unit 121 counts the number of pixels for each pixel value in a block, and updates the pixel value in a block on the basis of decision by a majority. Specifically, the palm region detection unit 121 updates a pixel value existing in a small number, by a pixel value existing in a great number.

For example, the block that is the second counting from the left and is the second counting from the top of the mask image 21 is constituted of three pixels with pixel value=1 and one pixel with pixel value=0. When the palm region detection unit 121 counts the number of pixels for each pixel value, the result is that the number of the pixels with pixel value=1 is three and the number of the pixels with pixel value=0 is 1. Because the pixels with pixel value=1 exit in a greater number, the palm region detection unit 121 updates the pixel values of pixels with pixel value=0 to 1.

Also, the block that is the third counting from the left and is the fourth counting from the top of the mask image 21 is constituted of one pixel with pixel value=1 and three pixels with pixel value=0. When the palm region detection unit 121 counts the number of pixels for each pixel value, the result is that the number of the pixels with pixel value=1 is one and the number of the pixels with pixel value=0 is three. Because the pixels with pixel value=0 exit in a greater number, the palm region detection unit 121 updates the pixel values of pixels with pixel value=1 to zero.

Figure 13:
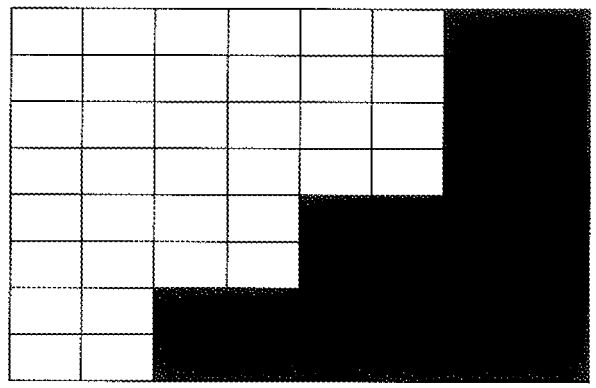
FIG. 13 illustrates an example of a mask image after update.

When the pixel values of other blocks are updated similarly, the process image 22 as illustrated in FIG. 13 is generated. Note that when pixels with pixel value=0 and pixels with pixel value=1 exit in the same number in a block, the pixel values of the pixels in the block are updated to a preset pixel value (0 or 1).

When many pixels are pixels labeled as the palm (palm pixels) and a few pixels are pixels labeled as the background (background pixels) in a block, the block pixels are highly likely to be pixels that were erroneously determined. Also, when many pixels are background pixels and a few pixels are palm pixels in a block, the palm pixels are highly likely to be pixels that were erroneously determined. Accordingly, by performing update of pixel values in a mask image on the basis of decision by a majority as described above, i.e. by updating labels assigned to pixels of a captured image, it is possible to detect a region of a palm highly accurately.

Explanations will be continued by again referring to FIG. 10.

In step S212, the palm region detection unit 121 performs, through labeling a fill-in-blank process of the background for the mask image.

Hereinafter, explanations will be given for a fill-in-blank process of the background based on labeling.

Figure 14:
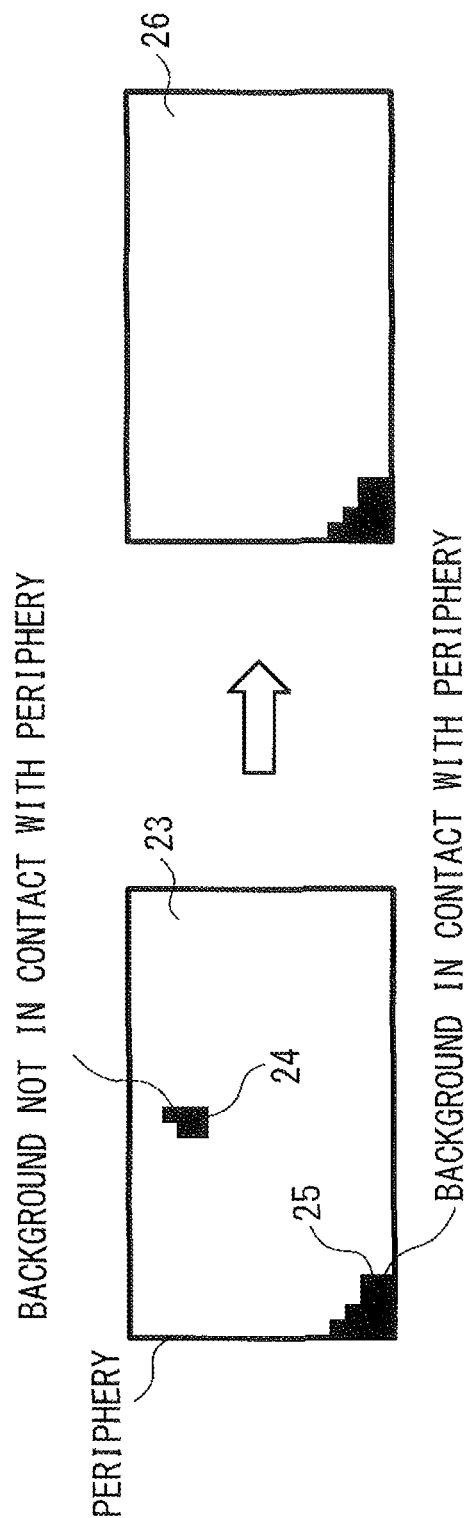
FIG. 14 explains a fill-in-blank process of the background by labeling.

FIG. 14 explains a fill-in-blank process of the background based on labeling.

In this case, a fill-in-blank process of the background is performed on a mask image 23. The mask image 23 is an image in which the pixel value of a pixel labeled as a palm is 1 and the pixel value of a pixel labeled as a background is zero. In the mask image 23, pixels labeled as the palm are represented in white and pixels labeled as the background are represented in black.

First, the palm region detection unit 121 groups a plurality of pixels having pixel value=0 (background pixels) in the mask image 23 in such a manner that adjacent background pixels belong to the same group. An adjacent pixel refers to a pixel that is adjacent to a given pixel on the upper side, the lower side, the left side, the right side, at the upper right corner, the upper left corner, the lower right corner or the lower left corner. In the mask image 23, groups of background pixels (background pixel groups) 24 and 25 are generated.

The palm region detection unit 121 adds a pixel with pixel value=0 to the periphery of the mask image 23. Thereby, the mask image 23 is enclosed by pixels with pixel value=0. Hereinafter, a pixel added to the periphery of the mask image 23 will be referred to as a peripheral pixel. The palm region detection unit 121 assigns label number=1 to a peripheral pixel.

The palm region detection unit 121 assigns label number=2, which is a label number for a peripheral pixel, to each pixel in a background pixel group that is not adjacent to peripheral pixels. In FIG. 14, none of the pixels of the background pixel group 24, which is located at the upper middle portion of the mask image 23, is adjacent to peripheral pixels. Accordingly, the palm region detection unit 121 assigns label number=2 to each pixel of the background pixel group 24.

The palm region detection unit 121 assigns label number=1, which is the same label number as that of peripheral pixels, to each pixel of background pixel groups that are adjacent to peripheral pixels. In FIG. 14, the background pixel group 25 including a background pixel adjacent to a peripheral pixel is located to the lower left of the mask image 23. Accordingly, the palm region detection unit 121 assigns label number=1 to each pixel of the background pixel group 25.

The palm region detection unit 121 updates, to 1, the pixel value of a pixel to which a label number that is different from peripheral pixels has been assigned in the mask image 23. In FIG. 14, label number=2 has been assigned to each pixel of the background pixel group 24 and because they are different from label number=1 of the peripheral pixels, the pixel value of each pixel of the background pixel group 24 is updated to 1. The pixel value of a background pixel that is not adjacent to peripheral pixels and that is enclosed by pixels labeled as a palm like those in the background pixel group 24 is updated to 1. In other words, a pixel of a captured image corresponding to a pixel to which a label number different from peripheral pixels is labeled as the palm.

Thereby, a pixel of a captured image corresponding to the position of the background pixel group 24 is extracted as a palm in a process in a later stage.

Also, the pixel value of a pixel to which the same label number as the peripheral pixels is not changed. In FIG. 14, label number=1 has been assigned to each pixel of the background pixel group 25 and because they are the same as label number=1 of the peripheral pixels, the pixel value of each pixel of the background pixel group 25 is left unchanged.

The above fill-in-blank process of the background updates the pixel value of each pixel of the background pixel group 24 to 1 and the mask image 23 becomes like a mask image 26. The palm region detection unit 121 deletes the peripheral pixels after the completion of the fill-in-blank process.

The definitions of a palm region by expressions (1) through (4) are approximation, resulting in a slight error with respect to the actual palm region. The actual palm region, which is represented by the oblique lines in FIG. 7, exists beyond the region enclosed by UMAX and UMIN, and the actual palm region, which is represented by the oblique lines in FIG. 8, exists beyond the region enclosed by VMAX and VMIN. Thus, there is a possibility that a pixel having a pixel value around the boundary of the palm region will be erroneously determined.

For example, there is a case where part of the palm in a captured image is determined to be the background. Thus, when a process image including only a detected palm region is generated, the palm may have a hole in some cases. A pixel determined to be the background enclosed by pixels determined to be a palm is a palm in a captured image, and is highly likely to be a pixel that has been erroneously determined.

Updating of a pixel value in a mask image performed by the above blocking and fill-in-blank process makes it possible to update the label of a pixel that is highly likely to have been erroneously determined and thereby to detect a region of a palm highly accurately.

Explanations will be continued by again referring to FIG. 10.

Figure 2:
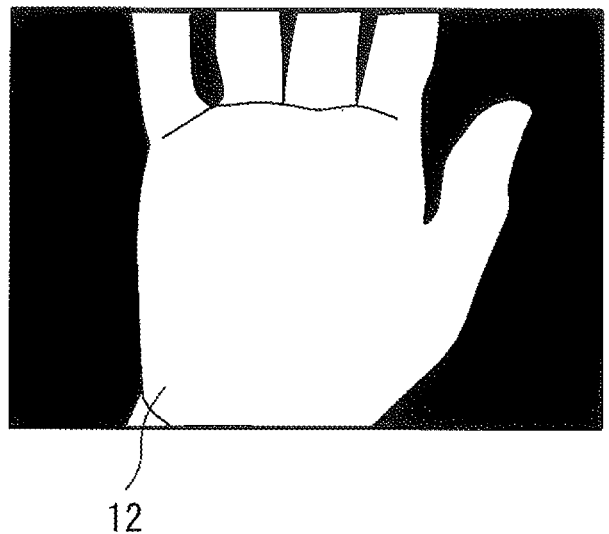
FIG. 2 illustrates an example of detection of a palm.

In step S213, the palm region detection unit 121 extracts a palm region of a captured image so as to generate a process image that includes only a palm. In more detail, the palm region detection unit 121 multiplies the pixel value of each pixel of the captured image by the pixel value of each pixel of the mask image so as to generate a process image. By multiplying the pixel value of each pixel of the captured image by the pixel value of each pixel of the mask image, the process image 14 is generated in which the pixel values of portions other than the palm region (background) is zero and which includes only the palm 12 as illustrated in FIG. 2. In other words, pixels labeled as the palm in the captured image are extracted.

Thereafter, the process image including only the palm region is input to a vein extraction unit 131, a vein included in the palm region is detected, and registration data is generated by the registration data generation unit 141 or matching with the registration DB 162 is performed by the matching unit 151.

The biometric image processing apparatus 101 according to the embodiment makes it possible to detect a palm region highly accurately, leading to higher authentication accuracy.

Also, the biometric image processing apparatus 101 according to the embodiment does not perform conversion from a YUV format into an HSV format, making it possible to reduce calculation amounts.

Figure 15:
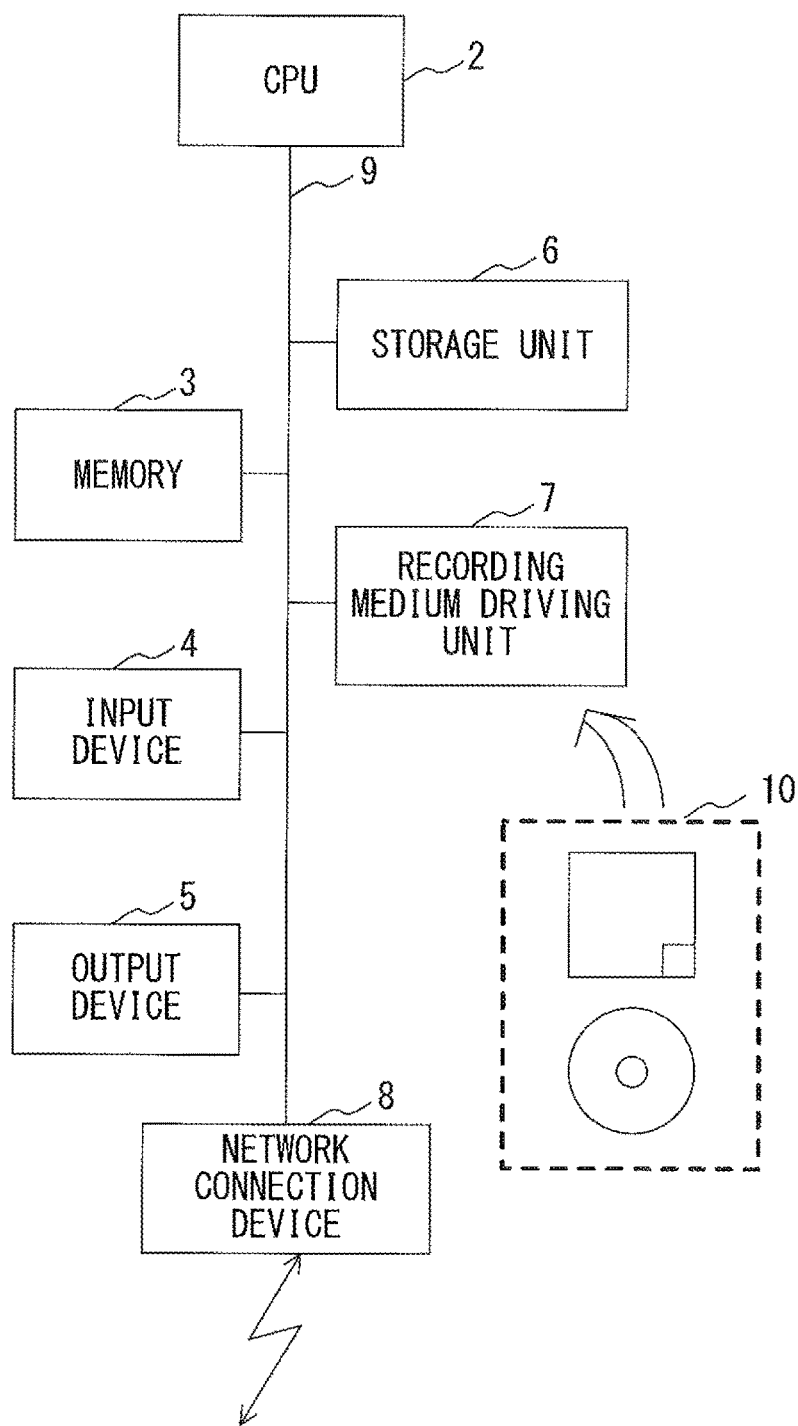
FIG. 15 illustrates a configuration of an information processing apparatus (computer).

FIG. 15 illustrates a configuration of an information processing apparatus (computer).

The biometric image processing apparatus 101 of the embodiment can be implemented by for example an information processing apparatus (computer) 1 as illustrated in FIG. 15.

The information processing apparatus 1 includes a CPU 2, a memory 3, an input device 4, an output device 5, a storage unit 6, a recording medium driving unit 7 and a network connection device 8, all of which are connected to each other via a bus 9.

The CPU 2 is a central processing unit that controls the entire information processing apparatus 1. The CPU 2 operates as the palm region detection unit 121, the vein extraction unit 131, the registration data generation unit 141 and the matching unit 151.

The memory 3 is a memory such as a Read Only Memory (ROM), a Random Access Memory (RAM), etc. that, for execution of a program, temporarily stores a program or data stored in the storage unit 6 (or the portable recording medium 10). The CPU 2 executes a program by using the memory 3 so as to perform the above described various types of processes.

In such a case, a program code itself read from the portable recording medium 10 etc. implements the functions of the embodiment.

The input device 4 is used for inputting instructions or information from the user or the operator and for obtaining data etc. used by the information processing apparatus 1. Examples of the input device 4 include a keyboard, a mouse a touch panel, a camera, a sensor, etc. The input device 4 corresponds to the image pickup unit 111.

The output device 5 is a device that outputs questions and processing results to the user and the operator, and operates under the control of the CPU 2. Examples of the output device 5 include a display device, a printer, etc.

Examples of the storage unit 6 include a magnetic disk device, an optical disk device, a tape device, etc. The information processing apparatus 1 stores the above program and data in the storage unit 6 so as to read them onto the memory 3 to use them on an as-needed basis. The memory 3 and the storage unit 6 correspond to the storage unit 161.

The recording medium driving unit 7 drives the portable recording medium 10 so as to access recorded contents in it. For a portable recording medium, an arbitrary computerreadable recording medium such as a memory card, a flexible disk, a Compact Disk Read Only Memory (CD-ROM), an optical disk, a magnetooptical disk, etc. can be used. The user stores the above program and data in the portable recording medium 10 so as to read them onto the memory 3 to use them on an as-needed basis.

The network connection device 8 is a communication interface that is connected to an arbitrary communication network such as a Local Area Network (LAN), a Wide Area Network (WAN), etc. so as to perform data conversion accompanying the communications. The network connection device 8 transmits data to a device connected via a communication network or receives data from a device connected via a communication network.

Note that the information processing apparatus 1 does not have to include all the constituents illustrated in FIG. 15, and some of the constituents may be omitted in accordance with conditions or purposes. For example, when output of questions or process results to the user or the operators is not conducted, the output device 5 may be omitted. Also, when the information processing apparatus 1 does not access the portable recording medium 10, the recording medium driving unit 7 may be omitted.

All examples and conditional language provided herein are intended for pedagogical purposes to aiding the reader in understanding the invention and the concepts contributed by the inventor to further the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A biometric image processing apparatus comprising:
    a memory; and
    a processor coupled to the memory and configured to
        obtain an image including pixels,
        obtain a Y value, a U value and a V value in a YUV space for each pixel,
        determine, for each pixel, a first range for the U value obtained for that pixel, based on the Y value obtained for that pixel,
        determine, for each pixel, a second range for the V value obtained for that pixel, based on the Y value obtained for that pixel,
        determine, for each pixel, whether or not the U value and the V value obtained for that pixel are respectively in the first range and second range determined for that pixel, and
        extract, from the image, pixels each of which has been determined to have the U value and V value obtained for that pixel respectively in the first range and second range determined for that pixel.

2. The biometric image processing apparatus according to claim 1, wherein
    the processor divides the image into a plurality of regions, and further extracts, from each of the regions, one or more pixels that have not been extracted from that region based on the number of the pixels that have been extracted from that region.

3. The biometric image processing apparatus according to claim 2, wherein
    the extraction, by the processor and from each of the regions, of one or more pixels that have not been extracted from that region is performed when the number of the extracted pixels is greater than the number of the pixels that have not been extracted regarding that region.

4. The biometric image processing apparatus according to claim 1, wherein
    the processor further extracts, from the image, one or more pixels that have not been extracted and that are enclosed by the extracted pixels.

5. A biometric image processing method comprising:
    obtaining, by a processor, an image including pixels;
    obtaining, by the processor, a Y value, a U value and a V value in a YUV space for each pixel of an image;
    determining, by the processor and for each pixel, a first range for the U value obtained for that pixel, based on the Y value obtained for that pixel;
    determining, by the processor and for each pixel, a second range for the V value obtained for that pixel, based on the Y value obtained for that pixel;
    determining, by the processor and for each pixel, whether or not the U value and the V value obtained for that pixel are respectively in the first range and second range determined for that pixel; and
    extracting, by the processor and from the image, pixels each of which has been determined to have the U value and V value obtained for that pixel respectively in the first range and second range determined for that pixel.

6. The biometric image processing method according to claim 5, further comprising
    dividing, by the processor, the image into a plurality of regions, wherein
    the extracting includes extracting, from each of the regions, one or more pixels that have not been extracted from that region based on the number of the pixels that have been extracted from that region.

7. The biometric image processing method according to claim 6, wherein
    the extraction, by the processor and from each of the regions, of one or more pixels that have not been extracted from that region is performed when the number of the extracted pixels is greater than the number of the pixels that have not been extracted regarding that region.

8. The biometric image processing method according to claim 5, wherein
    the extracting includes extracting, from the image, one or more pixels that have not been extracted and that are enclosed by the extracted pixels.

9. A non-transitory storage medium having stored therein a biometric image processing program that causes a computer to execute a process comprising:
    obtaining an image including pixels;
    obtaining a Y value, a U value and a V value in a YUV space for each pixel of an image;
    determining, for each pixel, a first range for the U value obtained for that pixel, based on the Y value obtained for that pixel;
    determining, for each pixel, a second range for the V value obtained for that pixel, based on the Y value obtained for that pixel;
    determining, for each pixel, whether or not the U value and the V value obtained for that pixel are respectively in the first range and second range determined for that pixel; and
    extracting, from the image, pixels each of which has been determined to have the U value and V value obtained for that pixel respectively in the first range and second range determined for that pixel.

10. The non-transitory storage medium according to claim 9, further comprising
dividing the image into a plurality of regions, wherein the extracting includes extracting, from each of the regions, one or more pixels that have not been extracted from that region based on the number of the pixels that have been extracted from that region.

11. The non-transitory storage medium according to claim 10, wherein
the extraction, from each of the regions, of one or more pixels that have not been extracted from that region is performed when the number of the extracted pixels is greater than the number of the pixels that have not been extracted regarding that region.

12. The non-transitory storage medium according to claim 9, wherein
the extracting includes extracting, from the image, one or more pixels that have not been extracted and that are enclosed by the extracted pixels.

* * * * *